United States Patent
Ogawa et al.

[11] Patent Number: 5,383,943
[45] Date of Patent: Jan. 24, 1995

[54] SOIL BLOCK FOR POT PLANT CULTIVATION AND A METHOD OF CULTIVATING POT PLANTS USING THE SAME

[75] Inventors: Kinya Ogawa, Kawasaki; Yoichi Hirasawa, Higashikurume, both of Japan

[73] Assignee: Shin-Etsu Chemical Co. Ltd., Tokyo, Japan

[21] Appl. No.: 101,313

[22] Filed: Aug. 3, 1993

[30] Foreign Application Priority Data

Aug. 8, 1992 [JP] Japan ................................. 4-232891
Dec. 4, 1992 [JP] Japan ................................. 4-350579

[51] Int. Cl.⁶ ............................................... A01B 79/00
[52] U.S. Cl. ........................................ 47/58; 47/79; 47/59
[58] Field of Search ............ 47/79, 79 V, 79 I, 79 CR, 47/81, 59 C, 59 CD, 64, 65 F

[56] References Cited
U.S. PATENT DOCUMENTS

3,866,352  2/1975  Herveling ........................... 47/81

FOREIGN PATENT DOCUMENTS

| | | | |
|---|---|---|---|
| 71960 | 6/1981 | Australia | 47/79 V |
| 2045516 | 3/1972 | Germany | 47/64 |
| 2619305 | 11/1976 | Germany | 47/65 F |
| 3510513 | 9/1986 | Germany | 47/79 |
| 1257417 | 10/1989 | Japan | 47/65 F |
| 8403752 | 7/1986 | Netherlands | 47/64 |
| 2014836 | 9/1979 | United Kingdom | 47/65 F |
| 631120 | 11/1978 | U.S.S.R. | 47/79 |

*Primary Examiner*—Henry E. Raduazo
*Attorney, Agent, or Firm*—Townsend & Banta

[57] ABSTRACT

A soil block for pot plant cultivation having a water-retentive layer, a hydrophobic layer above it, and a soil layer above that is provided. The water-retentive layer may consist of a sand layer, a water layer or a sand layer retaining water. The hydrophobic layer may consist of hydrophobic particles which are sand and/or dirt particles treated with a water-repellent agent, a water-repellent membrane including nonwoven fabric, woven fabric or knitted fabric treated with a water-repellent agent, or such. According to the method of cultivating pot plants, the pot plants are planted in the soil layer, which is the upper layer in the soil block for pot plant cultivation, and water is supplied to maintain the water content in the water-retentive layer at a constant level.

7 Claims, 2 Drawing Sheets

SOIL BLOCK FOR POT PLANT CULTIVATION AND A METHOD OF CULTIVATING POT PLANTS USING THE SAME

FIELD OF THE INVENTION

This invention relates to a soil block for pot plant cultivation and a method of cultivating pot plants using the same, and more specifically to a soil block for pot plant cultivation which allows cultivation of pot plants for a long period of time without watering, and a method of cultivating pot plants using the same.

BACKGROUND OF THE INVENTION

In the cultivation of pot plants such as bonsai, water management can be listed as the most important and difficult problem. That is, overwatering may rot the roots, while underwatering may kill the plants. In a conventional water management method for pot plants, for example, the following procedures are repeatedly carried out: a prescribed amount of water is supplied periodically everyday, or; the degree of wetness of the soil in which the pot plants were planted is observed periodically, and when the soil looked dry water is supplied to sufficiently cancel the dryness.

However, for common soil, the water content becomes very high and is likely to be excessive immediately after watering, and on the other hand, later the water evaporates quickly and the water content drops and is likely to cause a water shortage. Also, with the methods such as those described above, watering has to be done daily or every few days. This not only requires a lot of time and work but also means that the plants may die if watering stops for a long period of time for reasons such as when the caretaker is away from the home. Supplying an excessive amount of water, i.e. more than usual in order to prevent that, can cause root rotting.

SUMMARY OF THE INVENTION

The object of this invention is to provide a soil block for pot plant cultivation which retains an adequate amount of water for a long period of time and allows easy water management, and a method of cultivating pot plants using same.

According to a first feature of the invention, a soil block for pot plant cultivation includes a water-retentive layer, a hydrophobic layer above the water-retentive layer, and a soil layer above the hydrophobic layer.

The water-retentive layer may consist of a water layer or a sand layer for retaining water. The hydrophobic layer may include hydrophobic particles which are sand and/or dirt particles treated with a water-repellent agent. The hydrophobic layer may also include a water-repellent porous membrane. The water-repellent membrane may be nonwoven fabric, woven fabric or knitted fabric treated with a water-repellent agent. The water-repellent agent may be a silicone or fluoro type water-repellent agent. A porous support member which supports layers above the water-retentive layer may be provided either between the water-retentive layer and the hydrophobic layer or in the upper part of the water-retentive layer. The soil layer may consist of common soil or soil containing peat moss or a water absorbent polymer.

According to a second feature of the invention, a method of cultivating pot plants includes the steps of planting pot plants in a cultivating soil layer in a soil block for pot plant cultivation including a water-retentive layer, a hydrophobic layer above the water-retentive layer, and a soil layer above the hydrophobic layer, and supplying water to said water-retentive layer.

Water may be supplied in such a way that the water retained in the water-retentive layer maintains a constant water surface level. Water stored in a sealed container may be supplied to the water-retentive layer through the lower part of the container.

According to a third feature of the invention, a method of cultivating bonsai plants includes the steps of planting bonsai plants in the soil layer of a soil block for pot plant cultivation including a water-retentive layer, a hydrophobic layer above the water-retentive layer, and a soil layer above the hydrophobic layer, and supplying water to the water-retentive layer.

Water may be supplied in such a way that the water retained in the water-retentive layer maintains a constant water surface level. Water stored in a sealed container is supplied to the water-retentive layer through the lower part of the container.

According to a fourth feature of the invention, a pot for cultivating pot plants includes an inner container to contain soil and a sealed outer container to store water, wherein said outer container has a control hole in its lower part, and the lower parts of the inner container and outer container are connected to each other.

BRIEF DESCRIPTION OF THE DRAWING

This invention will be explained in more detail in conjunction with appended drawings.

DETAILED DESCRIPTION OF THE INVENTION

Figure 1:
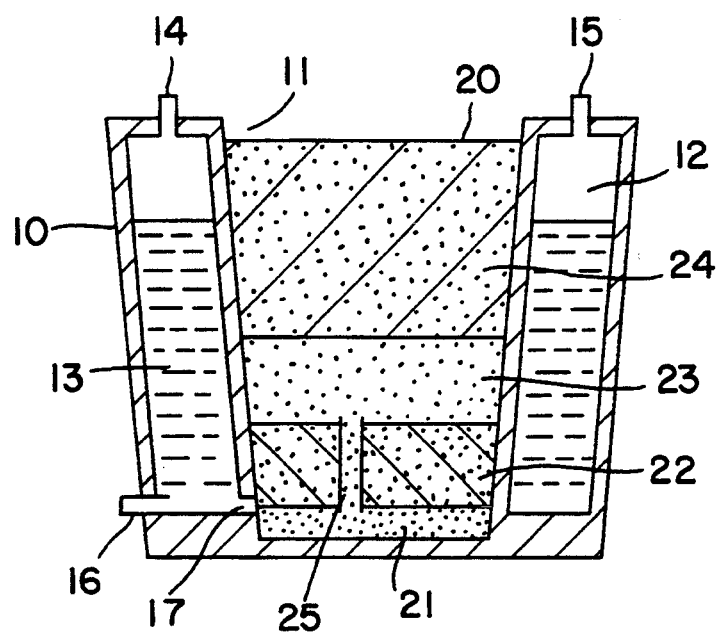
FIG. 1 is a cross-sectional view of an example of this invention which shows the soil block for pot plant cultivation in the pot for pot plant cultivation.

Next, this invention is described in detail. The soil block for pot plant cultivation involved in this invention is a soil mass with a 3-layer structure including a water-retentive layer, a hydrophobic layer above it, and a soil layer above that.

The water-retentive layer used in this invention can be composed of a sand layer, a water layer, or a sand layer containing water. When the water-retentive layer is a water layer, a porous plate should be provided between the water-retentive layer and the hydrophobic layer or in the upper part of the water-retentive layer to support the upper layers.

A support member, such as a porous plate, which supports upper layers may be provided on top of the water-retentive layer, The water-retentive layer itself does not have to support upper layers and the water-retentive layer may be composed of pebbles and such which are coarser than sand and such, or even a water layer without any sand or such filler can be used.

The hydrophobic layer used in this invention has so-called hydrophobicity, which conceptually includes water-repellency, and this layer may be, for example, a layer containing hydrophobic particles. It can also be a layer containing a water-repellent membrane or open cell foam.

When hydrophobic particles are used for the hydrophobic layer, the hydrophobic particles can be anything hydrophobic which is in particle form, and the material may be anything, either inorganic or organic. For the hydrophobic particles, sand and/or dirt particles with their particle surfaces treated with a water-repellent agent are practical, and they can be used individually or mixed together. More preferable is water-repellent sand which is sand treated with a water-repellent agent.

When a water-repellent membrane is used for the hydrophobic layer; nonwoven fabric, woven fabric or knitted fabric treated with a water-repellent agent can be used for the water-repellent membrane. It is desirable that the material have good weather resistance, in particular, vinylon, polyester, polypropylene, etc., are preferable.

When a water-repellent agent used, there is no specific limitation as long as it is a generally used water-repellent agent. More preferable is a silicone type or a fluoro type. Oils can be used as water-repellent agents as well.

For the silicone water-repellent agent, a silicone compound represented by the following general formula (1) is an example. It can be used directly (without solvents) or it can be used after dilution in solvents such as toluene, xylene or trichloroethylene, or it can be used in an emulsion form. Also, hardening catalysts such as dibutyl tin dilaurate, dibutyl tin diacetate, dioctyl tin laurate or iron octate can be used.

$$R^1_a R^2_b SiO_x \quad (1)$$

$R^1$ stands for homo or hetero, unsubstituted or substituted monovalent hydrocarbon groups;
$R^2$ stands for homo or hetero groups selected from hydrolyzable groups, —OH and —H;
a and b are numbers defined as $0 \leq a < 4$, $0 \leq b \leq 4$ and $0 < a+b \leq 4$; and
$x = (4-a-b)/2$.

For example, in the general formula (1), $R^1$ is a group made by replacing all or part of the hydrogen atoms bonded to carbon atoms with halogen atoms or cyano groups and such groups include alkyl groups with a carbon number of 1-15, such as methyl, ethyl, propyl and decyl groups, alkenyl groups such as vinyl and alkyl groups, aryl groups such as phenyl groups, cyclo alkyl groups.

$R^2$ can be hydrolyzable groups such as alkoxy groups, acytoxy groups, ketoxime groups, amino groups, aminoxy groups, amide groups, enoxy groups and alkenyloxy groups, halogen groups such as chlorine-, —$OR^3$ ($R^3$ is Na or K), —OH or —H.

For the actual silicone compounds, the following compounds represented by formulas (2) through (5) or their partially hydrolyzed products, for example, can be used.

HO—Si(ONa)(CH$_3$)—[OSi(ONa)CH$_3$]$_n$—OH (n: 0, 1, 2)     (2)

CH$_3$—[SiO(CH$_3$)$_2$]$_m$—[SiO(H)(CH$_3$)]$_l$—Si(CH$_3$)$_3$
(l, m: 0 or integer)     (3)

R$^4$—[SiO(CH$_3$)$_2$]$_k$—Si(CH$_3$)$_2$R$^4$ (k: integer, R$^4$: —OH, —CH=CH$_2$, OCH$_3$)     (4)

CH$_3$SiCl$_3$, C$_{10}$H$_{21}$SiCl$_3$, CF$_3$CH$_2$CH$_2$SiCl$_3$,
CH$_3$Si(OCH$_3$)$_3$, CF$_3$CH$_2$CH$_2$Si(OCH$_3$)$_3$     (5)

A silazane compound represented by formula (6)

(CH$_3$)$_3$SiNH—Si(CH$_3$)$_3$     (6)

is also useful as a water-repellent agent for use in this invention.

For the fluoro water-repellent agent, fluoro compounds represented by the following general formula (7), (10) to (19) and (22) are examples. It can be used after dilution in solvents, or it can be used in an emulsion form, if necessary. In the formulas, l, m and n represent integers.

 (7)

X stands for H or CH$_3$. Y stands for either (8) or (9).

 (8)

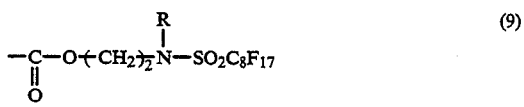 (9)

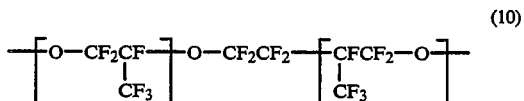 (10)

 (11)

 (12)

 (13)

 (14)

 (15)

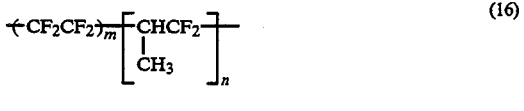 (16)

 (17)

 (18)

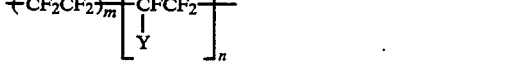 (19)

Y stands for —OCF$_3$ or either (20) or (21).

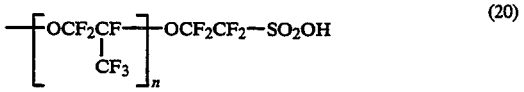 (20)

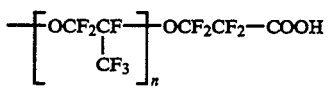

R stands for a cyclohexyl group or a butyl group.

As a fluoro type water-repellent agent, one denaturated by organosilane or organopolysiloxane may be useful, and particularly, one denaturated by organosilane or organopolysiloxane including a hydrolyzable group. OH group or H may be useful for obtaining long life water-repellency.

An example of such silane compounds is a fluorosilicone shown below as formula (23).

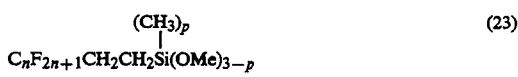

[n is an integer of 6 to 8; p is any of 0, 1, or 2; and Me stands for $CH_3$.]

An example of a compound represented by the formula (23) is a silane compound shown below as formula (24) or (25).

Another example of a fluoro water-repellent agent is a copolymer with other silanes such as $RSi(OMe)_3$, $R_2Si(OMe)_2$ or $H\cdot RSi(OMe)_2$ (R is an alkyl group having 1 to 12 carbons.) as well as a perfluoroaorylate. Expecially, a co-polymer with an alkylsilane having a long chain is preferable.

Further example is a co-polymer of:

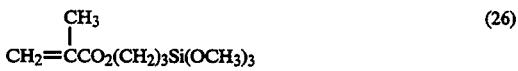

and

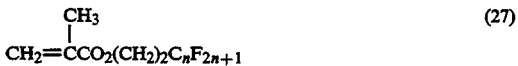

where n is an integer.

When treating surfaces of sand or dirt particles with a water-repellent agent to prepare hydrophobic particles, it is sufficient to follow methods usually employed in the surface treatment of fine particles. For example, it is possible to mix various silicone oils with sand using mechanochemical methods, thus performing surface treatment to obtain water-repellent sand.

For the hydrophobic particles, in addition to water-repellent sand as described above, fine particles of high molecular polymers (plastics) whose surfaces are hydrophobic can be used. In particular, organosilicone types are preferable, and polymethylsilsesquioxane is even more preferable.

Also, for example, it is possible to use waste plastic crushed into a particle form, thus effectively using waste plastic to solve the waste plastic disposal problem, It is also possible to give a water-repellent treatment to these high molecular polymers before use.

In addition to the hydrophobic particles described above as examples, hydrophobic particles including hydrophobic particulate metal oxides such as silica, alumina, titania, zirconia, vanadium acetate and iron oxide, crushed products of glass beads and oil shale, and oil sand can be used. These are more preferable when their surfaces have been treated with a silicone water-repellent agent. However, oil shale and oil sand can be used effectively without silicone treatment.

The hydrophobicity of the hydrophobic layer can be adjusted at will by changing the type of the hydrophobic particles and/or the water-repellent membrane, and the thickness of the hydrophobic layer. That is, the conditions can be selected as necessary according to the type, size and shape of the hydrophobic particles constituting the layer, the type, material, etc., of the water-repellent membrane, the depth of the hydrophobic layer from the soil surface, water control factors, etc. For example, it is possible to adjust the level of hydrophobicity by properly mixing water-repellent sand, which consists of hydrophobic particles, and common sand not treated with a water-repellent agent, which consists of non-hydrophobic particles.

For example, the thickness of the hydrophobic layer is determined according to the type of plant to be cultivated in the pot, and particularly to the water requirements of the plant. For those which require a lot of water, such as azaleas, the thickness of the hydrophobic layer should be relatively thin, such as about 0.2–2.0 cm thickness. It is preferable to locate a water path, such as a thin glass tube containing sand, a nonwoven fabric and a fiber, through the thin hydrophobic layer so that the water can be moved easily from the layer below the hydrophobic layer to the layer above it by the water path.

While for pine trees, orange trees, etc., it is preferable to use relatively thick layers, such as of about 1.0–5.0 cm thickness.

It is sufficient if the hydrophobic layers in this invention are substantially composed of a hydrophobic material such as hydrophobic particles, and it is within the scope of this invention if particles with other characteristics are mixed in, as long as the hydrophobic characteristics of the layer as a whole are are not lost. It is possible to mix particles and such which have other useful characteristics in the hydrophobic layer within the range where hydrophobicity of the hydrophobic layer as a whole is not lost. For azaleas and such, it is also preferable to mix common sand into the hydrophobic sand and such to increase water permeability.

For the soil layer provided above the hydrophobic layer, soil commonly used for pot plant cultivation can be used. The thickness can be set at will according to the conditions of the pot plant roots.

In particular for pot plants which require a lot of water, it is preferable to use highly water absorbent soil such as common soil, sand treated with peat moss or a water-retentive polymer, or a mixture of a water absorbent polymer and soil.

When not so much water is needed, a soil layer consisting of a mixture of common soil and water-repellent sand can be used. When it is preferable to have the water content in the root area high enough that hydrophobic cultivation is possible, a water-repellent layer may be provided on top. This will prevent water evaporation.

In order to cultivate Dot plants by using the soil block for pot plant cultivation of this invention, it is sufficient to put the soil block for pot plant cultivation of this invention into a pot, plant the pot plants in the soil, and water them in a standard manner.

It is possible to put an already constructed soil block for pot plant cultivation in the pot. However, in general, it is also possible to prepare the materials and the pot, and then form the 3-layer structure described above in the pot to build the soil block for pot plant cultivation.

Watering of the pot plants can be done in a standard manner, i.e. from above, however considering the existence of the hydrophobic layer, it is preferable to directly supply water through the lower layer where the water-retentive layer is positioned. As the means to do this, it is preferable, for example, to gradually supply water from the lower portion of a sealed water supply tank to the lower layer of the soil block for pot plant cultivation, and thus maintain a constant water level in the lower part.

As described above, this invention can maintain the water content in soil at an adequate level for a long period of time to allow easy water management of pot plants, and therefore watering can be skipped for an extended period of time.

Next, this invention will be described by referring to examples. This invention is not limited to these examples.

FIG. 1 shows an example of a soil block for pot plant cultivation in a not for pot plant cultivation. The pot for pot plant cultivation 10 has a double container structure, i.e. the water supply tank (outer container) 12 is provided around the inner container 11 which houses the soil block for pot plant cultivation 20, and the water supply tank 12 holds the water 13. The water supply tank 11 has the water supply port 14 and the vent hole 15 near the top, and the control hole 16 near the bottom, each of which can be opened and closed at will. The inner tank 11 and the water supply tank 12 are connected through the connection hole 17 at the lowest point which can be opened and closed at will. A water path 25 is a glass tube containing sand.

EXAMPLE 1

First, common sand was laid to have a 3 cm thickness from the bottom of the inner container 11 of a 30-cm high pot for pot plant cultivation 10 whose structure is shown in FIG. 1. This sand layer was named the water-retentive layer 21. The connection hole 7 was provided at the position 3 cm from the bottom. If the position of the connection hole 17 is configured to be adjustable, then it preferably should be adjusted to this position.

Next, the water-repellent sand, which is No. 4 sand treated to contain 0.06% silane, and common sand were mixed at a 1:1 ratio and laid on to have a 5 cm thickness. This layer was named the water-repellent layer (hydrophobic layer) 22. A glass tube 25 containing the same common sand as the layer 21 for water path was placed to penetrate the water-repellent layer 22. Next, on top of said water-repellent layer 22. No. 7 sand was laid to have a 5 cm thickness (sand layer 23), and again on top of that, common soil was laid to have a 10 cm thickness, which was named the soil layer 24.

Figure 2:
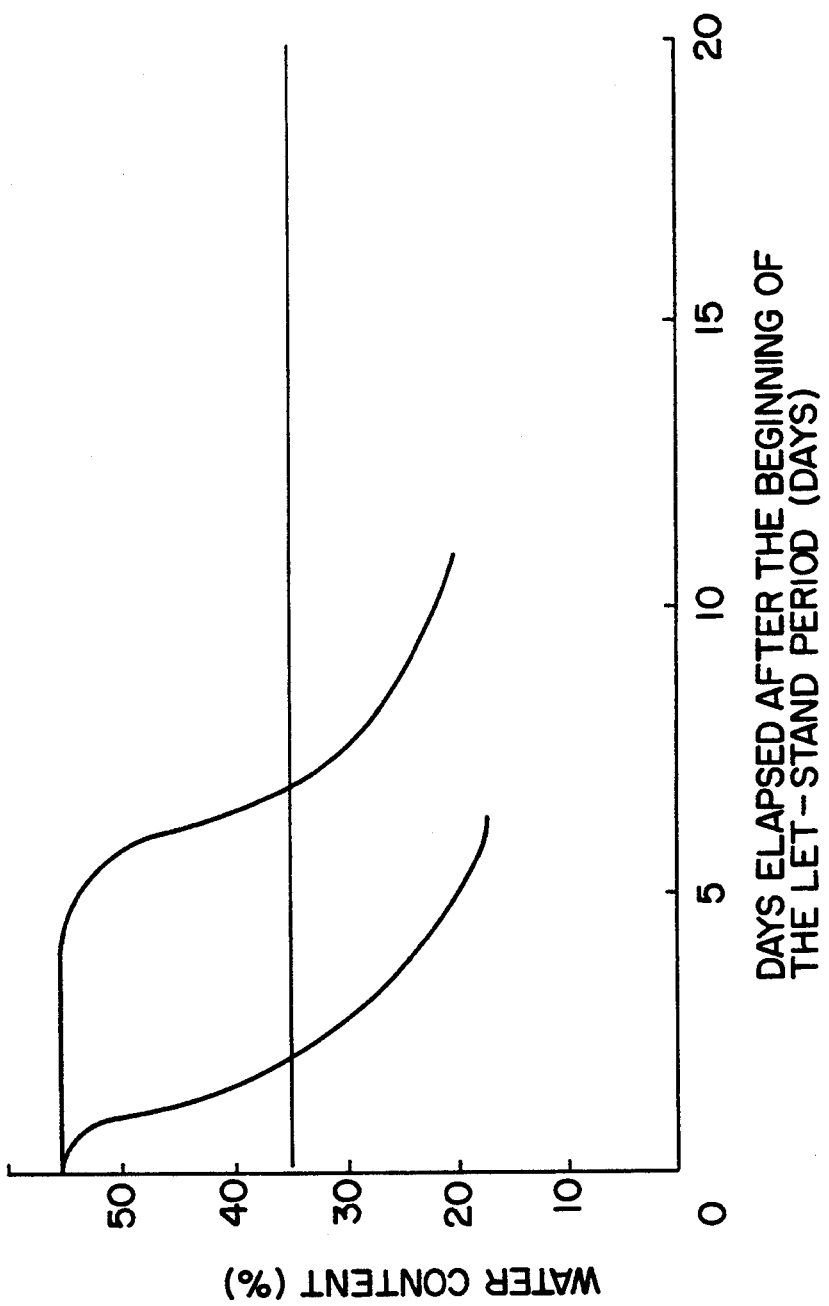
FIG. 2 is a graph which shows time dependent changes in the water contents of Example 1, Comparative Example 1 and Comparative Example 2.

Thus, the soil layers described above were laid in the pot configured as shown in FIG. 1, and 2.0 Liters of water were put into the supply tank 12. This pot was used as Example 1.

Water was supplied to the supply tank 12 through the supply port 14 with the control hole 16 closed and the vent hole 15 open. When it was filled up, the water supply was stopped, the water supply port 14 and the vent hole 15 were closed and the control hole 16 was opened. In this state, the water in the water supply tank 14 was pushed by the water pressure, through the connection hole 17, to gradually seep into the soil block for pot plant cultivation 12, and retained in the water-retentive layer 21.

When the water level in the water-retentive layer 21 dropped, air went through the connection hole 17 into the water supply tank 12, and, in turn, the water 13 was supplied to the water-retentive layer 21. When the water level reached the level of the connection hole 17, air did not go through the connection hole 17 into the water supply tank 12, and the supply of water 13 stopped.

COMPARATIVE EXAMPLE 1

Comparative Example 1 was prepared under the same conditions and with the same soil configuration as for Example 1, except that a sand layer consisting of No. 4 sand, instead of the water-repellent sand, was laid in place of said water-repellent layer to have the same height.

COMPARATIVE EXAMPLE 2

A soil block with the same configuration as Comparative Example 1 was put into a common pot without a water supply tank, and an adequate amount of water was poured onto it. This was used as Comparative Example 2.

The 3 types of pots as described above were let stand in a greenhouse at 35° C., and the changes in the water content of the soil layer 24 of each example was measured. The results are shown in FIG. 2.

Just after the beginning of the standing period, the water content of the soil layer 24 of Example 1 was about 35%, indicating adequate moisture, whereas the water content of the soil layer 24 of Comparative Example 1 and Comparative Example 2 was about 60%, indicating significantly excessive moisture.

Later on, the water content of Example 1 showed little change, compared with the beginning of the standing period, after 20 days. On the other hand, the water content of Comparative Example 1 did not change from the level at the beginning of the standing period for several days, but after 10 days the water supply tank was emptied and the water content dropped down to 25%. The water content of Comparative Example 2 dropped sharply right after the beginning of the standing period and was down to 23% after 2 days.

EXAMPLE 2

This example was prepared under the same conditions as Example 1, except that a 3% aqueous solution of Metrose 65SH-400 was mixed into the soil layer 24 to give a solid content of 1.5%.

COMPARATIVE EXAMPLE 3

This was prepared under the same conditions as Comparative Example 1, except that a 3% aqueous solution of Metrose 65SH-400 was mixed into the soil layer 24 to give a solid content of 1.5%.

The results of the experiments showed that the water content of the cultivating soil layer for Example 2 was 42% at the beginning of the standing period and had not changed after 20 days elapsed. On the other hand, for Comparative Example 3, the water content at the beginning of the standing period was 62%, but it dropped down to 42% after 10 days elapsed.

Although the invention has been described with respect to specific embodiment for complete and clear disclosure, the appended claims are not to be thus limited but are to be construed as embodying all modification and alternative constructions that may occur to one skilled in the art which fairly fell within the basic teaching herein set forth.

What is claimed is:

1. A method of cultivating pot plants, comprising the steps of:
   providing block for pot plant cultivation including a water-retentive layer, consisting essentially of sand and water, a second layer which consists essentially of sand and/or soil treated with a silicon or fluoro-type water-repellant agent, said second layer being above and in contact with said water-retentive layer, and a soil layer above said second layer;
   planting a pot plant in said soil layer; and
   supplying water to said water-retentive layer.

2. A method of cultivating pot plants, according to claim 1:
   wherein water is supplied in such a way that water retained in said water-retentive layer is maintained at a constant water surface level.

3. A method of cultivating pot plants, according to claim 2:
   wherein water stored in a sealed container is supplied to said water-retentive layer through lower part of said sealed container.

4. A method of cultivating bonsai plants, comprising the steps of:
   providing a soil layer of a soil block for pot plant cultivation comprising a water-retentive layer consisting essentially of sand and water, a second layer which consists essentially of sand and/or soil treated with a silicon or fluoro-type water-repellant agent above and in contact with said water-retentive layer, and a soil layer above said second layer;
   planting at least one bonsai plant in said soil layer; and
   supplying water to said water-retentive layer.

5. A method of cultivating bonsai plants, according to claim 4:
   wherein water is supplied in such a way that water retained in said water-retentive layer is maintained at a constant water surface level.

6. A method of cultivating bonsai plants, according to claim 5:
   wherein water stored in a sealed container is supplied to said water-retentive layer through a lower part of said sealed container.

7. A method of cultivating pot plants, comprising the steps of:
   providing a soil block for pot plant cultivation including a water-retentive layer consisting essentially of sand and water, a continuous and uniform hydrophobic layer above and in contact with said water-retentive layer, and
   a soil layer above said hydrophobic layer;
   providing a water conducting tube from said water-retentive layer through said continuous uniform hydrophobic layer;
   planting at least one bonsai plant in said soil layer; and
   supplying water to said water-retentive layer.

* * * * *